Patented Mar. 13, 1945

2,371,254

UNITED STATES PATENT OFFICE 2,371,254

THERAPEUTIC COMPOUND

Simon Jone Nathan, Washington, D. C.

No Drawing. Application June 27, 1942,
Serial No. 448,845

4 Claims. (Cl. 260—397.7)

The present invention relates to aliphatic aromatic compounds having bactericidal properties and particularly useful for therapeutic application.

The principal object of the invention is to provide a product characterized by the substitution of unsaturated aliphatic compounds with amino-aryl-sulfamides on the amino-nitrogen compound. Such a substitution product possesses increased bactericidal power and is less harmful than present available products of this character. The product of this invention has proved to be efficacious, particularly in combating streptococci, staphylococci and spirillac infections.

An equally important object of the invention is to provide a process in which unsaturated aliphatic compounds are chemically reacted with the amino-aryl-sulfamides and on their nitrogen and/or nucleus substitution products. The process is particularly advantageous when mineral acid esters of unsaturated aliphatic alcohols especially the halogen compounds (halogenides) are reacted with amino-aryl-sulfamides such as those having at least one hydrogen atom capable of reacting on the amino-nitrogen compound. Suitable acid binding agents may be included such as alkalies, carbonates, acetates, especially alkali acetates, pyridine and the like to counteract the presence of acids liberated which might interfere with the successful completion of the reaction.

The following are examples of suitable unsaturated compounds: allyl chloride, allyl bromide, allyl iodide, propargyl bromide, cinnamyl chloride, cinnamyl bromide, iso propenyl chloride. The amino-aryl-sulfamides which are suitable for reaction are, by way of example, of the following types:

(1) p-Aminobenzene-sulfomethylamide:

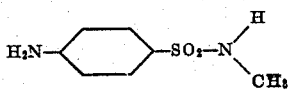

(1a) m-Aminobenzene-sulfomethylamide:

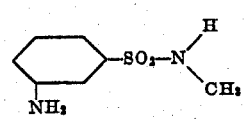

(2) p-Aminobenzene-sulfomethylphenylamide:

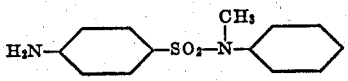

(2a) o-Aminobenzene-sulfomethylphenylamide:

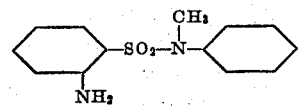

(3) p-Aminobenzene-sulfodiphenylamide:

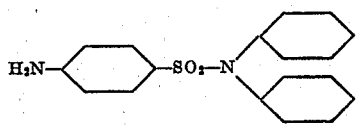

(4) p-Monomethylaminobenzene - sulfodiethylamide:

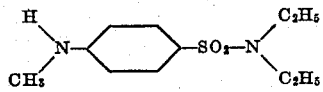

(5) p-Monomethylaminobenzene - sulfomethylphenylamide:

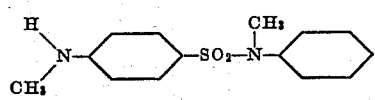

(6) p-Aminobenzene-sulfoleicamide:

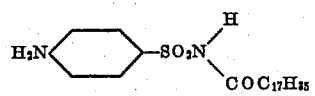

(7) p Aminobenzene-sulfo-β-oxyethylamide

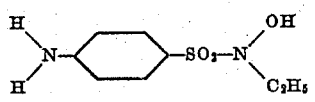

or/and the ether and ester derivatives on the β-oxy group. Numerous other unsaturated aliphatic compounds may be employed and many other amino-aryl-sulfamides and derivatives thereof may be utilized, those listed above being the more prominent and having been found quite useful for the purpose.

The following example will illustrate my invention, but I do not wish to be restricted thereto. The parts are by weight.

Example 344 parts of p-amino-benzene-sulfonamide are dissolved in about 800 parts of hot water and 150 parts of precipitated calcium carbonate are added. While the aqueous mass is boiling, there is added drop by drop 77 parts of allyl chloride.

When all of the allyl chloride has been added the mixture is kept heated for about 4 hours or until the reaction is completed. It is thereupon cooled down and to it should be added sufficient dilute muriatic acid to cause the p-allyl-amino-benzene-sulfamide formed to be separated out as a colorless precipitate which promptly crystallizes. Through recrystallization it may be further refined.

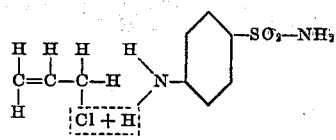

In the foregoing reaction, only one of the hydrogen atoms of the amino group is substituted, but both may be substituted, e. g. one by unsaturated aliphatic group such as the allyl and another by an aliphatic or aromatic radical, such as $CH_3$, $C_2H_5$,

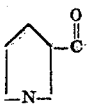

I claim:

1. The compound $N^4$-allyl-sulfanilamide having the formula:

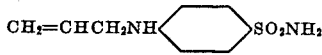

2. The process of producing $N^4$-allyl-sulfanilamide which comprises mixing an allyl halide with p-amino-benzene-sulfamide in the presence of an aqueous alkaline medium and recovering the $N^4$-allyl-sulfanilamide thus produced.

3. The process of producing allyl-sulfanilamides which comprises mixing an allyl halide with an aryl sulfamide selected from the group consisting of p-aminobenzene-sulfomethylphenylamide and p-aminobenzene-sulfodiphenyl amide in the presence of an aqueous alkaline medium and recovering the allyl-sulfanilamide thus produced.

4. An allyl-sulfanilamide having the formula:

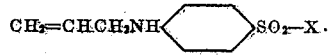

in which X is a radical selected from the group consisting of amino, methyl amino, methyl phenyl amino, and diphenyl amino.

SIMON JONE NATHAN.